Sept. 24, 1957 M. SANCHEZ 2,807,093
PRECISION LOCATOR GAGE FOR BORING MILL
Filed Oct. 26, 1953 2 Sheets-Sheet 1
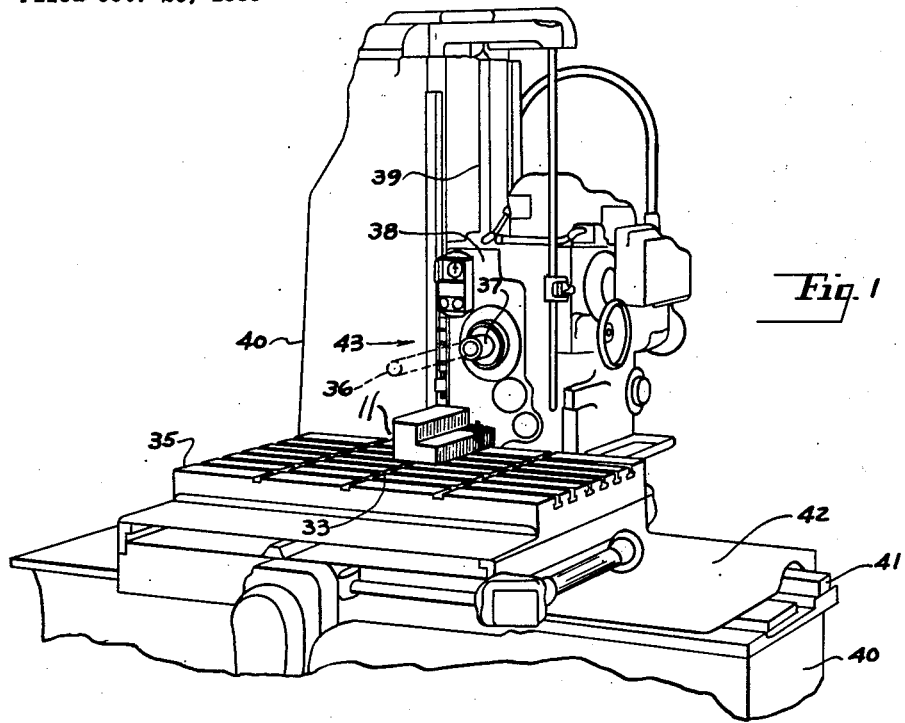
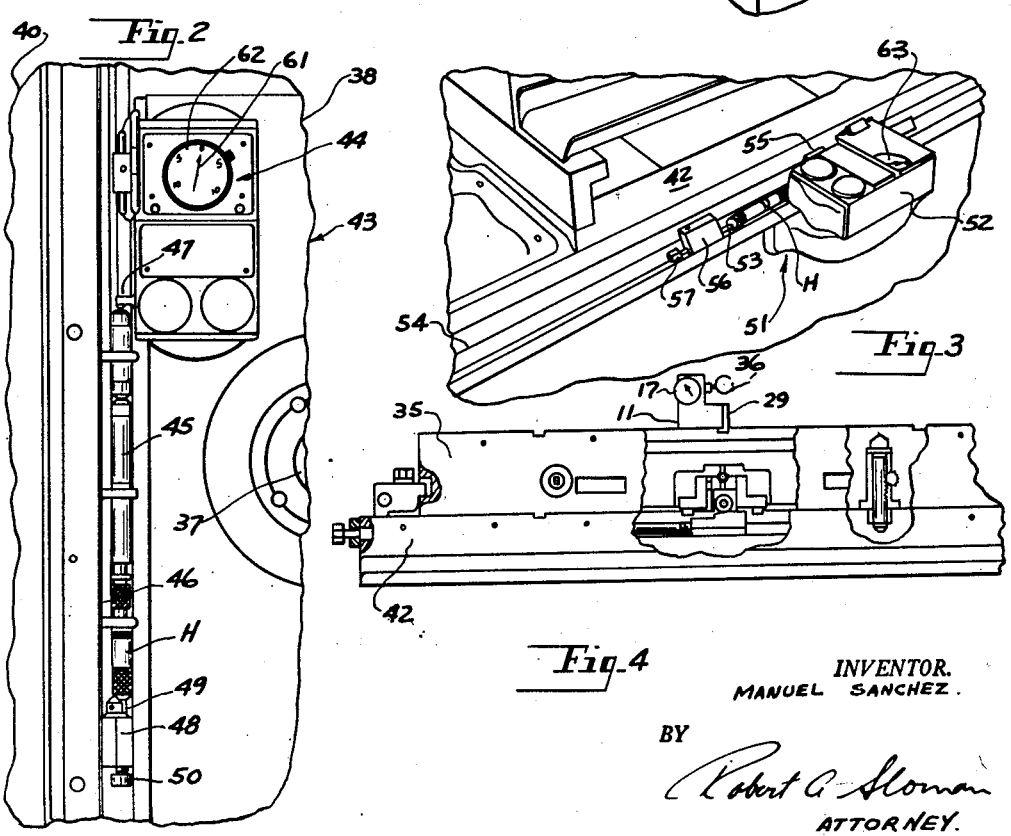
INVENTOR.
MANUEL SANCHEZ.
BY
Robert C. Sloman
ATTORNEY.

Sept. 24, 1957 M. SANCHEZ 2,807,093
PRECISION LOCATOR GAGE FOR BORING MILL
Filed Oct. 26, 1953 2 Sheets-Sheet 2
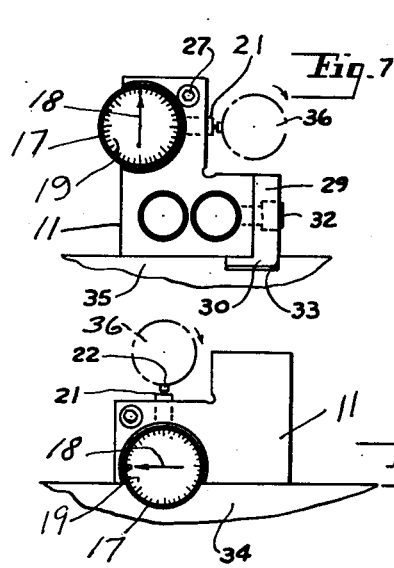
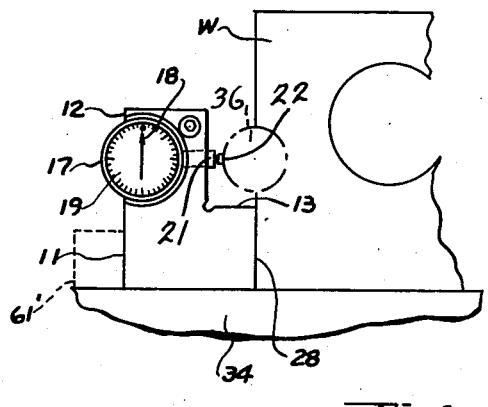
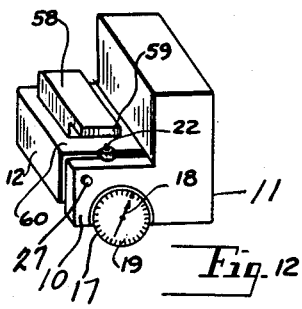
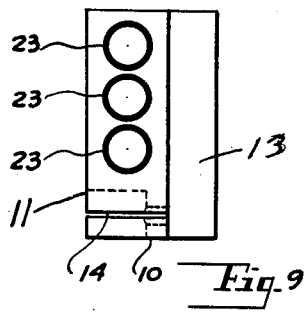
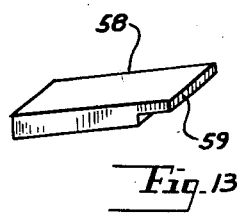
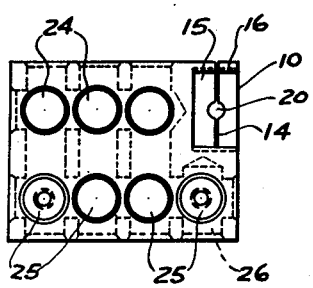
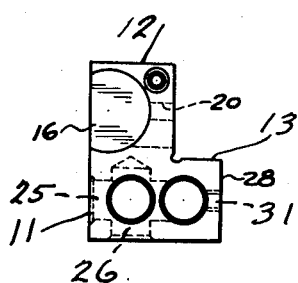
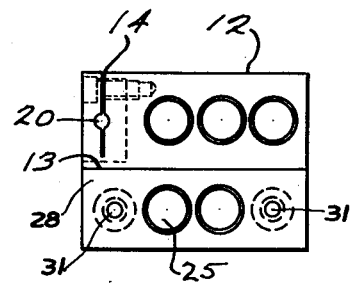
INVENTOR.
MANUEL SANCHEZ
BY
Robert A. Sloman
ATTORNEY.

United States Patent Office 2,807,093
Patented Sept. 24, 1957

2,807,093

PRECISION LOCATOR GAGE FOR BORING MILL

Manuel Sanchez, Detroit, Mich.

Application October 26, 1953, Serial No. 388,262

6 Claims. (Cl. 33—185)

This invention relates to gages, and more particularly to the gage adapted for use in conjunction with a jig boring mill.

It is the object of the present invention to provide a novel and simple construction of gage readily mountable upon the machine table or index table of a boring mill.

It is the further object of the present invention to provide an extremely accurate gage of this type adapted for cooperation with a rotatable test bar held in the cutting tool spindle of a boring mill.

It is the further object of the present invention to provide a gage construction for accurately setting and controlling the location of the machine spindle head in a vertical plane.

It is the further object to provide a gage of this type adapted for accurately positioning the machine table or index table in a horizontal plane.

It is the still further object to provide a gage of this type for accurately positioning an index table and its supporting slide with respect to the axis of the spindle head.

These and other objects will be seen from the following specification and claims, in conjunction with the appended drawings, in which:

Fig. 1 is a fragmentary perspective view of a jig boring mill.

Fig. 2 is a fragmentary elevational view of the automatic positioning unit for the vertically adjustable spindle mounting head thereof.

Fig. 3 is a fragmentary perspective view of the automatic positioning unit for the longitudinally adjustable slide thereof.

Fig. 4 is a fragmentary partially sectioned elevational view of the index table mounted upon the longitudinal slide, broken away for illustration.

Fig. 5 is a rear elevational view illustrating the use of the present gage upon the machine table for accurately locating a test bar mounted upon the vertically adjustable machine head and for measuring the vertical distance thereof above said table.

Fig. 6 is a fragmentary illustration of the use of the present gage, rotated 90 degrees registerable with a workpiece and test bar for setting up the longitudinal positioning unit.

Fig. 7 is a fragmentary elevational view similar to Fig. 6, but illustrating the mounting of the present gage upon an index table.

Fig. 8 is an end elevational view of the present gage with the dial indicator omitted.

Fig. 9 is a plan view thereof.

Fig. 10 is a right side elevational view thereof.

Fig. 11 is a left side elevational view thereof.

Fig. 12 is a perspective view of the gage corresponding to Fig. 5; and

Fig. 13 is a perspective view of the master set-up block.

It will be understood that the above drawings illustrate merely a preferred embodiment of the invention and a method of use, and that other embodiments are contemplated within the scope of the claims hereafter set forth.

Referring to the drawings, the present gage as shown in Figs. 6 through 11 includes a machined body of elongated rectangular shape and including the supporting base 11, the upwardly extending block 12 and the laterally extending block 13.

Block 12 toward one end thereof has a vertical slit 14 extending downwardly to the upper surface of block 13 defining the end plate 10. As viewed in Fig. 11, the block 12, as well as end plate 10 has opposed substantially semi-circular recesses 15 and 16 formed therein, of slightly greater extent than 180 degrees opening to the rear wall of block 12 and adapted to cooperatively and snugly receive therein the dial indicator body 17, including the pointer 18 and the calibrations 19.

The forward portion of block 12, as well as end plate 10, has horizontal opposed semi-cylindrical recesses defining the cylindrical opening 20 adapted to receive the stem 21 which projects forwardly of the dial indicator body 17, and from which centrally projects the dial indicator plunger 22. Said plunger is adapted for cooperative engagement with the rotatable test bar 36 mounted within the spindle 37 of the vertically adjustable head 38, shown in Fig. 1, forming a part of a jig boring mill, hereafter described in further detail.

To lighten the gage body, 11, 12, 13, there are provided as shown in Fig. 9, a plurality of vertically arranged circular slots 23, which extend throughout the height thereof. There are also provided transversely through the block 12, a longitudinally extending series of circular openings 24. An additional series of longitudinally extending openings 25 project through 11 and block 13.

As shown in Fig. 11, there is also provided an additional circular slot 26 which extends toward the recesses 15 and 16. The end plate not only receives in recess 16 the outer portion of dial indicator 17, but protectively encloses the same, yet making its face visible, but also provides a resilient retainer for securing the dial indicator stem 21.

The set screw 27 extends laterally through a transverse opening in end plate 10 operatively engaging plate 10 and threadedly engages a portion of block 12 for drawing up the end plate 10, tightly securing the dial indicator 17 in place. This provides an effective mounting and support for said dial indicator.

There is provided an upright wall 28 upon the block 13 which is perfectly flat and is adapted to receive thereagainst the upright locator key 29. Said key is secured thereto by the set screws 32 which extend into threaded openings 31, Fig. 10, formed in wall 28 of the block 13.

The locator key 29 includes at its lower end the horizontally disposed plate 30, one portion of which projects laterally below block 13, said plate being adapted for positioning within one of the transversely arranged slots 33 formed within the index table 35 of the boring mill shown in Fig. 1. It is contemplated, however, that a locator key be used only where the index table is used, as in Fig. 7; however said locator key is not used in the other positions of said gage as in Figs. 5 and 6 wherein the horizontal and vertical automatic positioning units are set-up with respect to the machine table where the same is not to be indexed during a particular boring operation.

34 generally designates a machine table, whereas 35, generally designates fragmentarily an index table, Fig. 7.

Referring to Fig. 1, there is shown a spindle 37 projecting inwardly and horizontally of the vertically adjustable head 38 of said boring mill. Said head is mounted upon the vertical guideways 39 which project upwardly from the machine bed 40.

Horizontally disposed guide ways 41 upon bed 40 support the longitudinally adjustable slide 42 upon bed 40, said slide 42 mounting the index table 35 as shown.

At 43 there is generally indicated an automatic positioning unit for use in conjunction with a vertically adjustable head 38, which positioning unit is shown on an enlarged scale in Fig. 2.

Said positioning unit includes the dial indicator 44, which is supportably mounted upon the vertically adjustable head 38 and which has a control projection 47 engageable with the uppermost of a plurality of longitudinally aligned and measure gage rods 45 of an extremely accurate dimension. One or more of said rods are slidably positioned within the measuring trough 46 forming a portion of the machine bed 40. There is provided a vertically adjustable stop 48 within said trough which has a contactor 49 engageable with the lower-most gage rod 45, which stop 48 is secured in the desired position of longitudinal adjustment by the set screw 50.

There is also shown in Fig. 3, fragmentarily and on an enlarged scale, an automatic longitudinal positioning unit 51, which includes the dial indicator 52, suitably secured to the longitudinal slide 42 of the machine. There is also provided a longitudinally extending trough 54 adapted to slidably receive one or a series of accurate end measure gage rods, the same as rods 45. The outer-most rod engages the contactor 55 on the dial indicator, and the innermost rod engages the contactor 53 on the longitudinally adjustable stop 56. This stop is slidable within the trough 54 and may be secured in the desired position of adjustment by the set screw 57.

Operation

In operation of a jig boring mill, or any boring mill, before the machine is used it is necessary that there be a height pick-up on initial adjustment for positively locating the axis of the boring tool spindle with respect to the top surface of the work table or index table 35.

For this purpose, the present gage 11, 12, 13 is initially positioned upon the index table 35, Fig. 1, or any work table, such as work table 34 of Fig. 5, and is arranged adjacent the rear portion of said table so that the dial indicator body 17 projects beyond the inner edge thereof. Initially, there is employed a set-up block 58, shown in Fig. 12, which is squared on all of its sides and has a horizontally extending over-hang portion 59, whose horizontally disposed undersurface is, for illustration, exactly ¼ of an inch above the plane of the bottom surface of the set-up block 58. This set-up block is positioned upon the top surface 60 of block 12 as it is shown in Fig. 12 and is moved thereover until the over-hang 59 registers above and with the plunger 22. This will produce a reading of the pointer 18 upon dial 19, which will be other than zero normally. The dial of the gage including the calibrations thereon is manually rotated until the zero calibration thereon is in registry with the pointer 18.

For illustration, and in the preferred embodiment of the invention, the vertical height of the block 12 as in Fig. 12, is exactly 1¼ inches, and by setting the dial indicator as above, the outer or upper end of the plunger 22 is exactly 1½ inches from the plane of the bottom surface of block 12, corresponding to the plane of the top surface of the work or index table 35. In the preferred embodiment of the invention, the test bar 36 inserted within the boring tool spindle 37, is exactly 1 inch in diameter. In adjusting the height pick-up for the vertically adjustable head 38, the head is lowered either manually or by power until the undersurface of the test bar 36, while rotating, is in such contact with plunger 22 as to produce a zero reading on the dial 19. It is then known that the axis of the test bar is exactly 2 inches above the plane of the work table or index table.

To complete the set-up of the machine, and as illustrated in Fig. 2, the stop 48, upon release of the set screw 50, will be slidable vertically within the trough 46. A gage rod 45 known to be exactly 2 inches in length is positioned within the trough lengthwise thereof as is also a standard micrometer head H, set at zero. The stop 48 is slid upwardly manually until the upper end of the gage rod engages the control projection 47 on the positioning unit 43, the lower end of the aligned micrometer head engaging control projection 49. With the pointer 61 registering with the zero of the calibrated dial 62, the set screw 50 is tightened and the stop 48 secured with respect to trough 46. By this method, the correct relationship between the axis of the test bar, or spindle 37, is exactly set for a vertical distance of 2 inches above the table 35.

Should it be desired to elevate the head 38, for any reason, the 2 inch vertical height will be re-established when upon downward adjustment of said head, control projection 47 re-engages the gage rod 45 and the pointer 61 registers zero on the calibrated dial 62.

By this construction the pre-determined vertical height pick-up is re-established.

Though not shown in the present invention, the positioning device 43 may be automatic in its control of the vertical feed movements of the head 38, so that the vertical movement of said head will be automatically stopped at the proper location. On the other hand, this mechanism need not be automatic, it merely being necessary that the vertical adjustment of the head be such that pointer 61 registers with the zero reading on dial 62.

For illustration, should it be desired to bore a hole in a workpiece whose center line is 6 inches above the plane of the table, then the head 38 will be elevated and the gage rod 45 removed and replaced with an accurate 6 inch gage rod. Thereafter, the head will be fed downwardly, manually or automatically, and when the control projection 47 engages the top of the gage rod 45 so that the pointer 61 reads zero, then it is known that the center of the hole bored in the workpiece mounted upon said table will be exactly 6 inches above the plane of said table.

Once the height pick-up has been set utilizing the present gage, the stop 48 is left in its adjusted position as above described.

The present gage will now be used by setting up the side pick-up or the correct initial longitudinal positioning of the table 35, and its support 42 with respect to some transverse line of reference, such as the edge of the workpiece W, fragmentarily shown in Fig. 6, or a stop 61' shown in dotted lines which may be positioned upon and immovably secured to the table 34, as indicated in Fig. 6.

For this purpose, the base 11 is rotated 90 degees from the position shown in Fig. 5, and the surface 28 of said gage brought into close contact with the workpiece W, which will be suitably clamped to the table 34.

Following the same procedure above described in connection with Fig. 2, the stop 56 shown in Fig. 3, with the set screw 57 loosened, is longitudinally slid along the trough 54 on the slide 42, and a standard micrometer head H which is set at zero is interposed between contact 53 of the stop 56, and contact 55 on the positioning device 52. After this with the indicator 63 reading zero, the set screw 57 is secured for maintaining the stop 56 in the set position shown in Fig. 3.

This means that with a boring tool thereafter inserted within the spindle 37 and with the indicator 63 reading zero, the axis of the tool will be exactly in alignment with the edge of the workpiece W.

As the vertical height had been previously set as above described, it is known that the plunger 22 was engaging the test bar 36 at its maximum diameter to thereby effect the correct setting of the stop 56 with respect to position indicator 52.

As the workpiece is oftentimes positioned upon the table 35 with respect to one or more stops, such as stop 61' of Fig. 6, the above described longitudinal setting of slide 42 may be accomplished without workpiece W, and with the upright edge of the gage 11, 12, 13 opposite from surface 28 in contact with the stop 61' shown in Fig. 6. By this construction, the stop 56 may be accurately set up, just as well as by utilizing the workpiece W.

Inasmuch as the edge 28 of block 13 is exactly 1½ inches from the opposite surface of base 11, and utilizing the same one inch diameter of test bar, when the slide 42 is longitudinally adjusted until said test bar so contacts plunger 22 that the pointer 18 returns to zero, then it is known that the axis of the spindle of the test bar is exactly 2 inches from the outer upright surface of base 11. Also, when the workpiece W is re-positioned on table 34 against stop 61' the axis of spindle 37 will be 2 inches from the edge of the workpiece. A standard micrometer head H is positioned in trough 54 with one end engaging contact 53 on stop 56. A 2 inch gage rod similar to rod 45 of Fig. 2 is also positioned in said trough in alignment with micrometer head H, with one end engaging said head and the other end engaging contact 55 of positioning element 52.

In the event, however, that the table 35 is to be indexed 180 degrees, for boring from both sides of a workpiece, then the side pick-up is slightly different from that described in connection with Fig. 6, inasmuch as it must be ascertained that the center of rotation of the index table 35 is exactly in registry with the test bar axis. For this purpose, the above described locating key 29 is used and is secured to the face 28 of the gage as by the screws 32, and the base extension 30 of said locator key immovably positioned within the central slot 33 of the index table 35, which generally corresponds to the center of rotation of said index table, but may not do so with the greatest accuracy. In adjusting the side pick-up for the table 35, the slide 42 is longitudinally adjusted until the test bar 36 while rotating contacts the plunger 22 so as to produce a zero reading of indicator 18.

The test bar 36 is temporarily removed and the table 35 is rotated 180 degrees. The gage is removed from slot 33, and replaced therein upon said 180 degree rotation and if the plunger 22 is not registering with the test bar, the distance between is accurately measured, and the slide 42 is fed longitudinally ½ the distance. This produces an extremely accurate positioning of the center of rotation of index table 35 with respect to the longitudinal axis of the test bar. This provides that upon boring opposite sides of a workpiece, the bored opening will be in exact alignment.

Thus, the present gage may be used in effecting the correct setting up of a boring mill in the manner above described in detail, and provides a very simplified mechanism for accomplishing this result.

The present gage including members 11, 12 and 13 is hereafter referred to in the claims as an elongated block of L-shape in cross section. For simplicity, base 11 and its lateral extension or block 13 are referred to in the claims simply as "a base."

Having described my invention, reference should now be had to the claims which follow for determining the scope thereof.

I claim:

1. A precision locator gage comprising an elongated block of L-shape in cross section with upright squared sides and ends and including a base with a flat bottom and on said base an upwardly extending block, said block being transversely slit down to said base parallel to and adjacent one of said ends defining a flexible end plate, said plate and adjacent wall of said block having formed therein respectively opposed upright substantially semi-circular recesses opening to one side of said block, a dial indicator nested in said recesses and having a cylindrical guide stem and reciprocal plunger therein, said recesses terminating at their centers in opposed semicylindrical recesses of reduced diameter forming a cylindrical opening cooperatively receiving said guide stem, and fastening means interconnecting under tension an outer portion of said end plate and adjacent block for immovably securing said dial indicator stem therebetween, the recess in said end plate extending to its outer wall exposing to view the dial of said indicator, said block having a flat upright side wall throughout its length, arranged at a predetermined distance from its opposite side wall, said base extending laterally of said block, and having a vertical side wall at a uniform distance from said block and extending throughout the length of said block, said plunger projecting laterally of the side wall on said block normally thereof at a predetermined set distance.

2. The gage of claim 1, a side wall of said base and the corresponding side wall of said block being positionable upon a boring mill table, the plunger of said indicator movably projecting above said stem for gaging registry with the undersurface of a rotating horizontally disposed test bar of predetermined diameter projecting from the spindle of a vertically adjustable boring mill head for establishing a height pick-up between said table and test bar.

3. The gage of claim 1, said fastening means including a screw retainingly engaging said end plate, extending therethrough and threadedly engaging said block.

4. The gage of claim 1, a side wall of said base and the corresponding side of said block being positionable upon a boring mill table with said plunger projecting upwardly to engage the undersurface of a horizontally disposed rotatable test bar for establishing a height pick-up, said base being rotatable 90 degrees upon said table with said plunger extending laterally for engagement with the side of said test bar for establishing a side pick-up between said table and test bar.

5. The gage of said claim 1, a side wall of said base and a corresponding side of said block being positionable upon a boring mill table, the plunger of said indicator movably projecting above said stem for gaging registry with the undersurface of a rotating horizontally disposed test bar of predetermined diameter projecting from the spindle of a vertically adjustable boring mill head for establishing a height pick-up between said table and test bar, said base being rotatable 90 degrees upon said table with said plunger extending laterally for engagement with the side of said test bar for establishing a side pick-up between said table and test bar.

6. The gage of claim 1, said plunger extending laterally, the side wall of said base being upright, an elongated locator key of rectangular cross section mounted in upright position upon said side wall throughout the length of the base, a right angular plate at the lower end of said key extending below and engaging the bottom of said base, and spaced fasteners securing the key to said base.

References Cited in the file of this patent

UNITED STATES PATENTS

| | | |
|---|---|---|
| 1,323,267 | Hanson | Dec. 2, 1919 |
| 1,445,699 | Macey | Feb. 20, 1923 |
| 1,579,291 | Emery | Apr. 6, 1926 |
| 1,901,242 | Hogg | Mar. 14, 1933 |
| 2,010,215 | Breitenstein | Aug. 6, 1935 |
| 2,145,401 | MacBride | Jan. 31, 1939 |
| 2,451,733 | Hochwarder | Oct. 19, 1948 |
| 2,455,024 | Schneider | Nov. 30, 1948 |
| 2,603,879 | Coutu | July 22, 1952 |
| 2,746,161 | Budnick | May 22, 1956 |
| 2,747,291 | Snyder | May 29, 1956 |